F. N. ALBERTSON.
FLUID GAGE FOR GASOLENE TANKS.
APPLICATION FILED AUG. 24, 1914.

1,181,052.

Patented Apr. 25, 1916.
2 SHEETS—SHEET 1.

Inventor
F. N. Albertson

F. N. ALBERTSON.
FLUID GAGE FOR GASOLENE TANKS.
APPLICATION FILED AUG. 24, 1914.
1,181,052.   Patented Apr. 25, 1916.
2 SHEETS—SHEET 2.
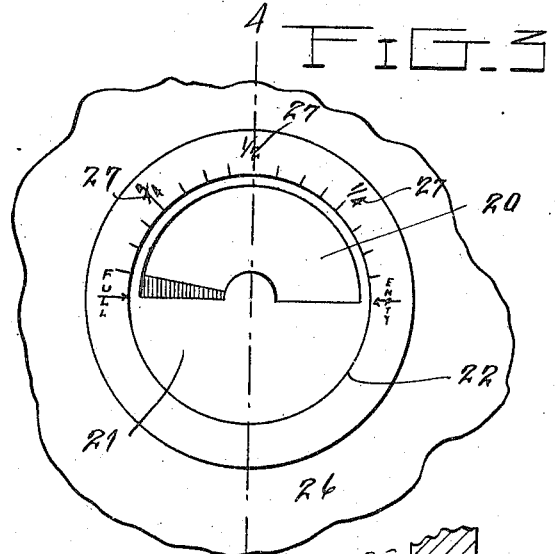
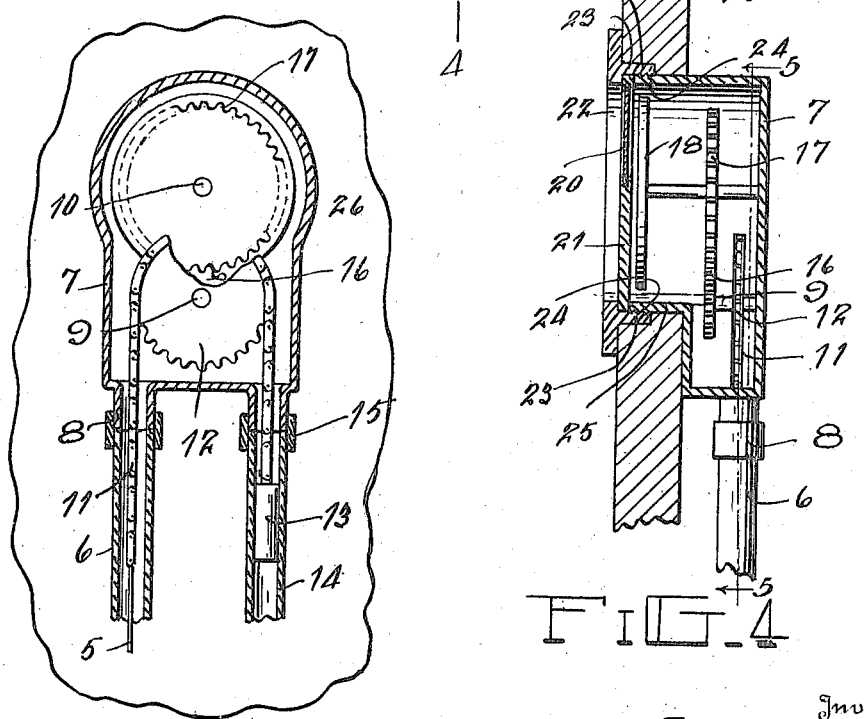
Witnesses
Chas. H. Trotter.
Wm. S. Fowler.
Inventor
F. N. Albertson
By
Attorney

UNITED STATES PATENT OFFICE.

FLOYD N. ALBERTSON, OF BROOKLYN, NEW YORK.

FLUID-GAGE FOR GASOLENE-TANKS.

1,181,052.   Specification of Letters Patent.   Patented Apr. 25, 1916.

Application filed August 24, 1914. Serial No. 858,318.

*To all whom it may concern:*

Be it known that I, FLOYD N. ALBERTSON, a citizen of the United States, residing at Brooklyn, in the county of Kings and State of New York, have invented certain new and useful Improvements in Fluid-Gages for Gasolene-Tanks; and I do hereby declare the following to be a full, clear, and exact description of the invention, such as will enable others skilled in the art to which it appertains to make and use the same.

This invention comprehends certain new and useful improvements in fluid gages and has for its primary object to provide a device of this character which will be of such construction that it may be especially adapted for use in connection with gasolene tanks on motor vehicles and the like to indicate the amount of gasolene in said tank.

The invention has for another object to provide a device of this character which will be of extremely simple construction and operation as well as highly efficient in use and which will include mechanism operated by movement of a float positioned upon guides in the tank, movement of the float upon the guides serving to control the position of a rotary indicating dial before a glass.

The invention has for a further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
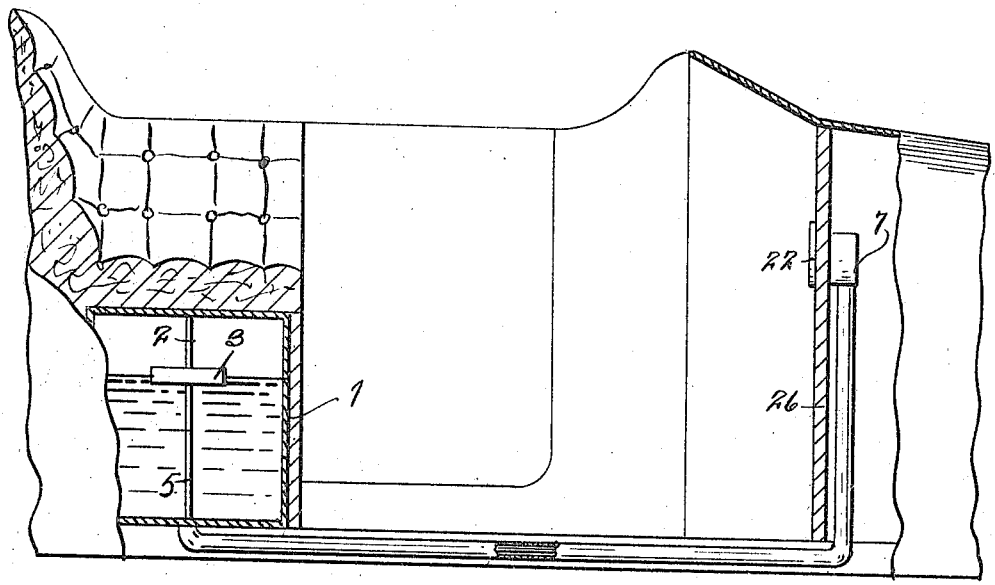
Figure 2:
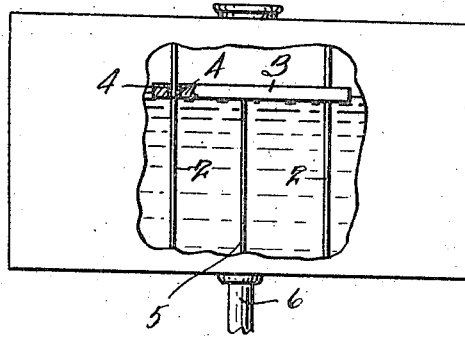
Figure 6:
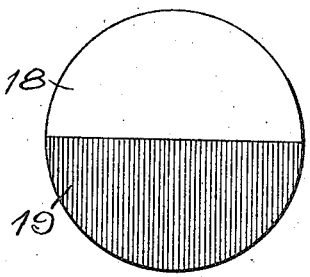

Figure 1 is a diagrammatic view of the invention in use, portions of an automobile being shown in section, Fig. 2 is a rear elevation of the tank with a portion of the same broken away to disclose the float mounted upon the guides in said tank, Fig. 3 is a fragmentary elevation, showing the dial and cap within which the same is positioned upon the dash-board, Fig. 4 is a detail vertical section on the plane of line 4—4 of Fig. 3, Fig. 5 is a detail vertical section on the plane of line 5—5 of Fig. 4, and Fig. 6 is a detail elevation of the rotary dial.

Referring in detail to the drawings by numerals, 1 designates a gasolene tank of a motor vehicle or the like and within which is placed a pair of parallel vertically extending guide rods 2 secured in position in the tank in any suitable manner and having a float 3 formed of cork or the like mounted for movement upon said guide rods, suitable protecting sleeves 4 being positioned in the openings of the float 3 and engaged around the guide rods 2 to prevent wearing of the float 3 during its movement upon said guide rods 2 as the amount of gasolene in the tank 1 increases or decreases. Depending from the float 3 is a cord 5 which extends through the bottom of the gasolene tank 1 between the guide rods 2 and extends along the interior of the guide tube 6 which has one end secured to the bottom of the gasolene tank 1 around the opening through which the cord 5 is extended, as will be readily understood by referring to the drawings.

The casing 7 serves as an indicator casing and has a pair of shafts 9 and 10 positioned therein and extended parallel to one another and preferably in a horizontal plane. The cord 5 is connected at its forward end to a sprocket chain 11 which is engaged over a sprocket wheel 12 mounted upon the shaft 9 and has a weight 13 mounted upon its opposite end and slidably engaged in a weight inclosing and guiding tube 14 which depends from the casing 7 and is preferably positioned parallel with the upper vertical portion of the tube 6, said tube 14 being connected with the casing 7, in any suitable manner, such as shown at 15.

It will be understood that as the contents of the gasolene supply tank 1 is consumed and the float 3 moved downwardly in said tank 1. the weight 13 will also move downwardly to take up the slack in the sprocket chain 11 and cord 5, thereby rotating the sprocket wheels 12 and shaft 9 in one direction. As the tank 1 is again filled and the level of the contents rises, the float 3 will also rise and pull upon the cord 5 and chain 11, thereby raising the weight 13 and rotating the sprocket wheel 12 and shaft 9 in the reverse direction. The shaft 9 also has a gear wheel 16 mounted thereon and engaged with the gear wheel 17 carried by the shaft 10, whereby said shaft 10 will be rotated upon rotation of the shaft 9, but in a reverse direction. It will therefore be seen that as the float 3 and weight 13 move downwardly upon a decrease of the quantity of gasolene in the tank 1, the indicating dial 18 carried by the shaft 10 will be rotated to bring the colored portion 19 thereof before the transparent portion 20 of the plate 21, positioned in the indicator top 22 forming the front of the indicator casing 7.

It will be understood that the colored portion 19 of the dial 18 is preferably red, but may be any other color desired and when the tank 1 is filled only the white or uncolored portion of the disk 18 may be seen before the transparent portion 20 of the plate 21. It will be understood that the transparent portion of the plate 21 is preferably formed of glass, but may be of any suitable material and the plate 21 may be held against the casing 7 in any suitable manner to form an air tight connection between said plate 21 and casing 7. The casing 7 may then be inserted through the dash-board 26 and the cap 22 secured upon said casing 7, said cap 22 having a circular flange 23 projecting from one side and provided with interior threads for engagement with the threaded portion 24 of the casing 7 which is engaged through the opening 25 in the dash-board 26 as previously mentioned or through any other desired portion of the vehicle. It will be understood that the tubes 6 and 14 are positioned against one face of the portion of the vehicle through which the casing 7 is engaged, while the remaining portion of the cap 22 is engaged against the opposite face of said portion of the vehicle, as clearly shown in the drawings, thereby securely holding the casing 7 in position without the use of screws or other securing members.

It will be understood that the cap 22 has suitable indicating characters 27 formed on one face around the transparent portion 20 of the plate 21, by means of which the amount of gasolene in the tank 1 may be readily determined by the position of the first edge of the colored portion 19 of the disk 18. It will further be evident that when all of the colored portion 19 of the indicating disk 18 may be seen before the transparent portion 20 of the plate 21, the tank 1 is entirely empty.

From the foregoing, it will be readily apparent that this gage will work under pressure, and may be readily applied to pressure tanks, as well as gravity tanks.

While I have shown and described the preferred embodiment of my invention, it will be understood that minor changes in the details of construction, combination and arrangement of parts may be made without departing from thte spirit and scope of the invention as claimed or sacrificing any of the advantages thereof.

What is claimed is:—

A gage comprising a casing, an indicating disk mounted upon a shaft positioned transversely through the casing, a sub shaft positioned beneath the first mentioned shaft and disposed within the casing, gears connected respectively centrally to the first mentioned shaft and on the end of the last mentioned shaft, said gears meshing with one another, a second gear secured centrally to the last mentioned shaft, a pair of cylindrical pipes connected to the under surface of said casing a spaced distance apart and communicating directly with the interior thereof, a flexible connection mounted over the last mentioned gear and meshing with the same and its opposite ends extending into opposite cylindrical pipes, a tank, a float, a pair of vertical guide rods for said float, said guide rods and float positioned within the tank, a cord connected to the lower surface of said float, said cord connected to one end of the flexible connection, the opposite end of said flexible connection having a weight thereon, said weight adapted to cause the rotation of said disk upon the movement of the weight downwardly upon the decrease of the liquid within the tank.

In testimony whereof I affix my signature in presence of two witnesses.

FLOYD N. ALBERTSON.

Witnesses:
Jno. A. Briggs,
A. S. Ingram.